US010241706B2

United States Patent
Mochizuki et al.

(10) Patent No.: US 10,241,706 B2
(45) Date of Patent: Mar. 26, 2019

(54) SEMICONDUCTOR DEVICE AND ITS MEMORY ACCESS CONTROL METHOD

(71) Applicant: Renesas Electronics Corporation, Tokyo (JP)

(72) Inventors: Seiji Mochizuki, Kodaira (JP); Katsushige Matsubara, Kodaira (JP); Ren Imaoka, Kodaira (JP); Hiroshi Ueda, Kodaira (JP); Ryoji Hashimoto, Kodaira (JP); Toshiyuki Kaya, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 25 days.

(21) Appl. No.: 15/582,252

(22) Filed: Apr. 28, 2017

(65) Prior Publication Data
US 2017/0337008 A1 Nov. 23, 2017

(30) Foreign Application Priority Data

May 20, 2016 (JP) .................................. 2016-101282
Feb. 23, 2017 (JP) .................................. 2017-031933

(51) Int. Cl.
*G06F 3/06* (2006.01)
*G06F 9/46* (2006.01)
(Continued)

(52) U.S. Cl.
CPC .......... *G06F 3/0637* (2013.01); *G06F 3/0619* (2013.01); *G06F 3/0632* (2013.01);
(Continued)

(58) Field of Classification Search
CPC ............ G06F 3/00; G06F 3/06–3/0619; G06F 3/062–3/0632; G06F 3/0635–3/0637;
(Continued)

(56) References Cited

U.S. PATENT DOCUMENTS 5,113,523 A * 5/1992 Colley .............. G06F 15/17343
712/12
5,481,734 A * 1/1996 Yoshida .............. G06F 9/30036
710/307

(Continued)

FOREIGN PATENT DOCUMENTS

JP 2014-048849 A 3/2014
JP 201448849 A * 3/2014

OTHER PUBLICATIONS

EMMA2: a high-performance hierarchical multiprocessor; Appiani et al.; IEEE Micro, vol. 9, iss. 1, pp. 42-56; Feb. 1989 (Year: 1989).*

(Continued)

*Primary Examiner* — Daniel C. Chappell
(74) *Attorney, Agent, or Firm* — McGinn IP Law Group, PLLC

(57) ABSTRACT

There is a problem that memory protection against access to a shared memory by a sub-arithmetic unit used by a program executed in a main-arithmetic unit cannot be performed in a related-art semiconductor device. According to one embodiment, a semiconductor device includes a sub-arithmetic unit configured to execute a process of a part of a program executed by a main-arithmetic unit, and a shared memory shared by the main-arithmetic unit and the sub-arithmetic unit, in which the sub-arithmetic unit includes a memory protection unit configured to permit or prohibit access to the shared memory based on an access permission range address value provided from the main-arithmetic unit, the access to the shared memory being access that arises from a process executed by the sub-arithmetic unit.

18 Claims, 16 Drawing Sheets

(51) Int. Cl.
  *G06F 12/14* (2006.01)
  *G06F 21/79* (2013.01)
(52) U.S. Cl.
  CPC ............ *G06F 3/0673* (2013.01); *G06F 9/468* (2013.01); *G06F 12/1433* (2013.01); *G06F 12/1441* (2013.01); *G06F 21/79* (2013.01)
(58) Field of Classification Search
  CPC . G06F 3/0638–3/0673; G06F 3/0674–3/0689; G06F 9/00–9/468; G06F 9/48–9/548; G06F 11/00–11/3696; G06F 12/00–12/1433; G06F 12/1441–12/16; G06F 17/30–17/30997; G06F 21/00–21/79; G06F 21/80–21/88; G06F 2003/0691–2003/0698; G06F 2009/45562–2009/45595; G06F 2201/00–2201/885; G06F 2206/00–2206/20; G06F 2209/00–2209/549; G06F 2211/00–2211/902; G06F 2212/00–2212/7211; G06F 2213/00–2213/4004; G06F 2221/00–2221/2153
  See application file for complete search history.

(56) References Cited

U.S. PATENT DOCUMENTS

| | | | | |
|---|---|---|---|---|
| 6,757,809 | B1 * | 6/2004 | Yoshida | G06F 9/30036 710/307 |
| 7,711,990 | B1 * | 5/2010 | Nickolls | G06F 11/3648 714/37 |
| 9,189,247 | B2 * | 11/2015 | Gehrmann | G06F 9/445 |
| 9,524,170 | B2 * | 12/2016 | Theur | G06F 9/3855 |
| 9,749,319 | B2 * | 8/2017 | Serebrin | G06F 12/1475 |
| 9,940,265 | B2 * | 4/2018 | Yun | G06F 12/14 |
| 9,954,681 | B2 * | 4/2018 | Case | G09C 1/00 |
| 10,013,199 | B2 * | 7/2018 | Tsirkin | G06F 3/0637 |
| 10,089,248 | B2 * | 10/2018 | Newman | G06F 21/53 |
| 10,101,936 | B2 * | 10/2018 | Kirshenbaum | G06F 12/1458 |
| 2003/0101292 | A1 * | 5/2003 | Fisher | G06F 9/3861 719/328 |
| 2005/0076010 | A1 * | 4/2005 | Bass | H04L 45/742 |
| 2008/0222116 | A1 * | 9/2008 | Bass | G06F 17/30985 |
| 2008/0244325 | A1 * | 10/2008 | Tyulenev | G06F 11/362 714/38.13 |
| 2010/0017893 | A1 * | 1/2010 | Foley | G06F 21/74 726/34 |
| 2010/0107249 | A1 * | 4/2010 | Krig | G06F 21/57 726/22 |
| 2010/0214304 | A1 * | 8/2010 | Jonas | G06F 12/1441 345/541 |
| 2011/0078760 | A1 | 3/2011 | De Perthuis | |
| 2011/0145934 | A1 * | 6/2011 | Abramovici | G06F 21/76 726/30 |
| 2012/0023311 | A1 * | 1/2012 | Yamamoto | G06F 9/3851 712/205 |
| 2013/0054933 | A1 | 2/2013 | Fister et al. | |
| 2013/0151567 | A1 * | 6/2013 | Ellison | G06F 17/30595 707/802 |
| 2013/0283391 | A1 * | 10/2013 | Mangalampalli | G06F 21/10 726/26 |
| 2014/0259149 | A1 | 9/2014 | Circello et al. | |
| 2015/0015589 | A1 * | 1/2015 | Chung | G06F 1/324 345/501 |
| 2015/0178090 | A1 * | 6/2015 | Theuer | G06F 9/3855 718/106 |
| 2015/0227414 | A1 * | 8/2015 | Varma | G06F 11/073 714/47.1 |
| 2016/0371496 | A1 * | 12/2016 | Sell | G06F 9/45558 |
| 2017/0187805 | A1 * | 6/2017 | Guim Bernet | G06F 3/0605 |
| 2018/0157590 | A1 * | 6/2018 | Persson | G06F 12/0833 |

OTHER PUBLICATIONS

Partially Separated Page Tables for Efficient Operating System Assisted Hierarchical Memory Management on Heterogeneous Architectures; Gerofi et al.; 13th IEEE/ACM International Symposium on Cluster, Cloud, and Grid Computing ; May 13-16, 2013 (Year: 2013).*
A fully configurable and scalable neural coprocessor IP for SoC implementations of machine learning applications; Martinez-Corral et al.; 2017 NASA/ESA Conference on Adaptive Hardware and Systems; Jul. 24-27, 2017 (Year: 2017).*
Machine translation of Japanese unexamined publication 2014-48849 (Year: 2014).*
Extended European Search Report dated Oct. 10, 2017 in the European counterpart Patent Application No. 17168956.5.

* cited by examiner

| MEMORY ARRANGEMENT | CPU | HARDWARE IP |
|---|---|---|
| SYSTEM AREA { REGISTER IN HARDWARE IP / OS } | ACCESS IS PERMITTED | ACCESS IS NOT PERMITTED |
| FUNCTIONALLY-SAFE APPLICATION | ACCESS IS PERMITTED | ACCESS IS NOT PERMITTED |
| FUNCTIONALLY-UNSAFE APPLICATION | ACCESS IS PERMITTED | ACCESS IS NOT PERMITTED |
| HARDWARE IP ACCESS PERMISSION RANGE (ACCESS PERMISSION START ADDRESS → ACCESS PERMISSION LAST ADDRESS) | | ACCESS IS PERMITTED |
| | | ACCESS IS NOT PERMITTED |

Fig. 3

| MEMORY ARRANGEMENT | CPU | HARDWARE IP |
|---|---|---|
| SYSTEM AREA { REGISTER IN HARDWARE IP ----- ----- OS | ACCESS IS PERMITTED | ACCESS IS NOT PERMITTED |
| FUNCTIONALLY-SAFE APPLICATION | ACCESS IS PERMITTED | ACCESS IS NOT PERMITTED |
| ACCESS PERMISSION START ADDRESS → HARDWARE IP ACCESS PERMISSION RANGE ← ACCESS PERMISSION LAST ADDRESS | | ACCESS IS PERMITTED |
| | | ACCESS IS NOT PERMITTED |
| FUNCTIONALLY-UNSAFE APPLICATION | ACCESS IS PERMITTED | ACCESS IS NOT PERMITTED |

Fig. 4

| MEMORY ARRANGEMENT | CPU (FUNCTIONALLY-SAFE APPLICATION) | CPU (FUNCTIONALLY-UNSAFE APPLICATION) | HARDWARE IP |
|---|---|---|---|
| REGISTER IN HARDWARE IP | ACCESS IS PERMITTED | ACCESS IS PERMITTED | ACCESS IS NOT PERMITTED |
| OS | | | |
| FUNCTIONALLY-SAFE APPLICATION | ACCESS IS PERMITTED | ACCESS IS NOT PERMITTED | ACCESS IS NOT PERMITTED |
| FUNCTIONALLY-UNSAFE APPLICATION | ACCESS IS PERMITTED | ACCESS IS PERMITTED | ACCESS IS NOT PERMITTED |
| HARDWARE IP ACCESS PERMISSION RANGE | | | ACCESS IS PERMITTED |
| | | | ACCESS IS NOT PERMITTED |

Fig. 14

SEMICONDUCTOR DEVICE AND ITS MEMORY ACCESS CONTROL METHOD

CROSS-REFERENCE TO RELATED APPLICATIONS

This application is based upon and claims the benefit of priority from Japanese patent application No. 2016-101282, filed on May 20, 2016 and Japanese patent application No. 2017-031933, filed on Feb. 23, 2017, the disclosure of which is incorporated herein in its entirety by reference.

BACKGROUND

The present disclosure relates to a semiconductor device and its memory access control method. For example, the present disclosure relates to a semiconductor device including a main-arithmetic unit that executes a program, a sub-arithmetic unit that executes a process of a part of the program, and a shared memory that is shared by the main-arithmetic unit and the sub-arithmetic unit, and relates to its memory access control method.

In a semiconductor device that performs various processes based on a program, there are cases where a plurality of programs are executed in one semiconductor device. Such a semiconductor device requires a memory protection mechanism to prevent interference in a memory space used by a plurality of programs (e.g., to prevent a plurality of programs from using the same area in a memory space). Therefore, Japanese Unexamined Patent Application Publication No. 2014-48849 discloses an example of the memory protection mechanism.

A semiconductor device disclosed in Japanese Unexamined Patent Application Publication No. 2014-48849 is a safety control system in which a drive control unit that performs drive control of a device to be controlled and a safety control unit that performs safety control related to the drive control are disposed in one processor, and in which: a predetermined storage area is allocated as a data storage area for each of the drive control unit and the safety control unit in advance; and the safety control system includes memory protection information storage means in which the storage area allocated to the safety control unit is registered as a storage area that cannot be accessed by the drive control unit, and memory protection means for, when the drive control unit performs memory access, referring to the access destination and registration information registered in the memory protection information storage means, and when the access destination is in the storage area that cannot be accessed by the drive control unit, preventing the drive control unit from accessing the storage area allocated to the safety control unit.

SUMMARY

The present inventors have found the following problem. A semiconductor device improves its processing speed by including, in addition to a main-arithmetic unit that performs various processes, a sub-arithmetic unit that executes a specific process of a part of a program executed by the main-arithmetic unit. Further, the semiconductor device including the main-arithmetic unit and the sub-arithmetic unit includes a shared memory that is shared by the main-arithmetic unit and the sub-arithmetic unit. In such a semiconductor device, the sub-arithmetic unit directly accesses the shared memory in order to increase the processing speed. It should be noted that the technique disclosed in Japanese Unexamined Patent Application Publication No. 2014-48849 can perform memory protection for the shared memory that occurs in the main-arithmetic unit. However, in the case where the sub-arithmetic unit directly accesses the shared memory that is also used by the main-arithmetic unit, there is a problem that the technique disclosed in Japanese Unexamined Patent Application Publication No. 2014-48849 cannot perform memory protection against access to the shared memory by the sub-arithmetic unit.

Other objects and novel features will be more apparent from the following description in the specification and the accompanying drawings.

According to one embodiment, a semiconductor device include: a sub-arithmetic unit configured to execute a process of a part of a program executed by a main-arithmetic unit; and a shared memory shared by the main-arithmetic unit and the sub-arithmetic unit, in which the sub-arithmetic unit includes a memory protection unit configured to permit or prohibit access to the shared memory based on an access permission range address value provided from the main-arithmetic unit, the access to the shared memory being access that arises in a process executed by the sub-arithmetic unit.

According to one embodiment, a semiconductor device and its memory access control method can perform memory protection against access to the shared memory by the sub-arithmetic unit.

BRIEF DESCRIPTION OF THE DRAWINGS

The above and other aspects, advantages and features will be more apparent from the following description of certain embodiments taken in conjunction with the accompanying drawings, in which:

FIG. 3 is a diagram for explaining a relation between a memory arrangement and access permission ranges at the time when the use of the memory is requested by a program whose reliability has not been verified yet in the semiconductor device according to the first embodiment;

FIG. 4 is a diagram for explaining a relation between a memory arrangement and access permission ranges at the time when the use of the memory is requested by a program whose reliability has already been verified in the semiconductor device according to the first embodiment;

FIG. 14 is a diagram for explaining a relation between a memory arrangement and access permission ranges in the semiconductor device according to the third embodiment;

DETAILED DESCRIPTION

For clarifying the explanation, the following descriptions and the drawings may be partially omitted and simplified as appropriate. Further, the same symbols are assigned to the same components throughout the drawings and duplicated explanations are omitted as required.

First Embodiment

Figure 1:
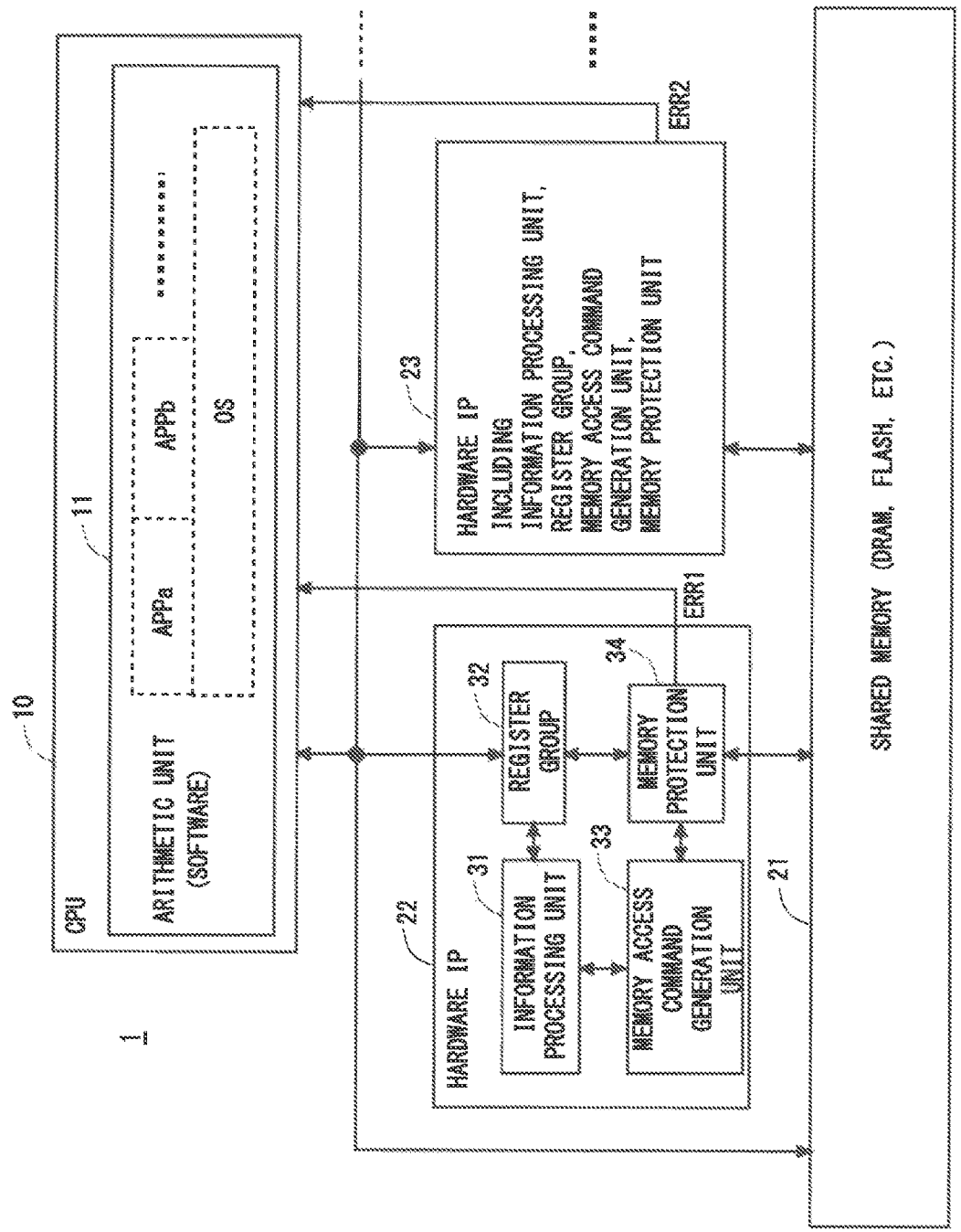
FIG. 1 is a block diagram of a semiconductor device according to a first embodiment.

FIG. 1 is a block diagram of a semiconductor device 1 according to a first embodiment. As shown in FIG. 1, the semiconductor device 1 according to the first embodiment includes a main-arithmetic unit (e.g., a CPU 10), a shared memory 21, and a sub-arithmetic unit (e.g., hardware IPs 22 and 23). In this specification, the sub-arithmetic unit (the hardware IP) means an arithmetic device that includes registers for storing processing instructions inside thereof and performs processing based on processing instructions set in the registers. The processing instruction may be a numerical value that is defined in advance so as to indicate a specific process. Note that values in registers are set by, for example, the main-arithmetic unit. Further, although FIG. 1 shows an example of a semiconductor device that includes a plurality of hardware IPs having identical configurations as sub-arithmetic units, the hardware IPs may have configurations different from each other.

The CPU 10 executes a program. In the semiconductor device 1, as the program is executed by the CPU 10, access to the hardware IPs 22 and 23 and the shared memory 21 occurs. The CPU 10 includes an arithmetic unit 11 that executes the program. The semiconductor device 1 may include a memory controller, an internal memory, an input/output interface circuit, and so on, though they are omitted in FIG. 1. Further, these components may be included in the CPU 10. In the example shown in FIG. 1, application programs APPa and APPb as well as an operating system (hereinafter referred to as an "OS") are being execution in the arithmetic unit 11.

The OS and the application programs APPa and APPb include programs having high reliability that have been verified at a high level and are sufficiently protected in regard to functional safety or security (hereinafter referred to as "reliability-verified programs") and programs that have been verified only at a low level and are not sufficiently protected in regard to functional safety or security (hereinafter referred to as "reliability-unverified programs") in a mixed manner. Information on whether a program is a reliability-verified program or a reliability-unverified program is included in the program in advance. The criterion for this determination is determined, for example, in accordance with a criterion specified in the International Standards Organization. Note that although the embodiment is explained on the assumption that the semiconductor device includes only one OS, actual embodiments are not limited in this way. That is, the number of OSs may be more than one.

Examples of the reliability-verified program include a self-driving application in an automobile. Meanwhile, examples of the reliability-unverified program include a moving-picture playback application. When a reliability-verified program and a reliability-unverified program are executed in the same CPU, it is necessary to prevent data of the reliability-verified program and the reliability-unverified program from interfering with each other (i.e., prevent the reliability-verified program and the reliability-unverified program from using each other's data). Note that although an example of an automobile is shown above, the actual application is not limited in this way.

The shared memory 21 is, for example, a volatile memory such as a DRAM (Dynamic Random Access Memory) or a nonvolatile memory such as a Flash memory. The shared memory 21 is accessed by the CPU 10 and the hardware IPs 22 and 23. Note that the shared memory 21 may be any memory used by the semiconductor device 1 and may be disposed in a semiconductor chip different from the chip in which the CPU 10 and the hardware IPs 22 and 23 are disposed.

Each of the hardware IPs 22 and 23 is a hardware component that executes a process of a part of the program executed by the CPU 10. For example, each of the hardware IPs 22 and 23 performs only (or mainly) a specific process such as a process for decoding an encoded image, an image conversion process that is performed as one process in an image recognition process, or a feature-value extraction process. In FIG. 1, the hardware IPs 22 and 23 have configurations identical to each other. Therefore, their configurations are explained by using the configuration of the hardware IP 22 as an example.

Figure 2:
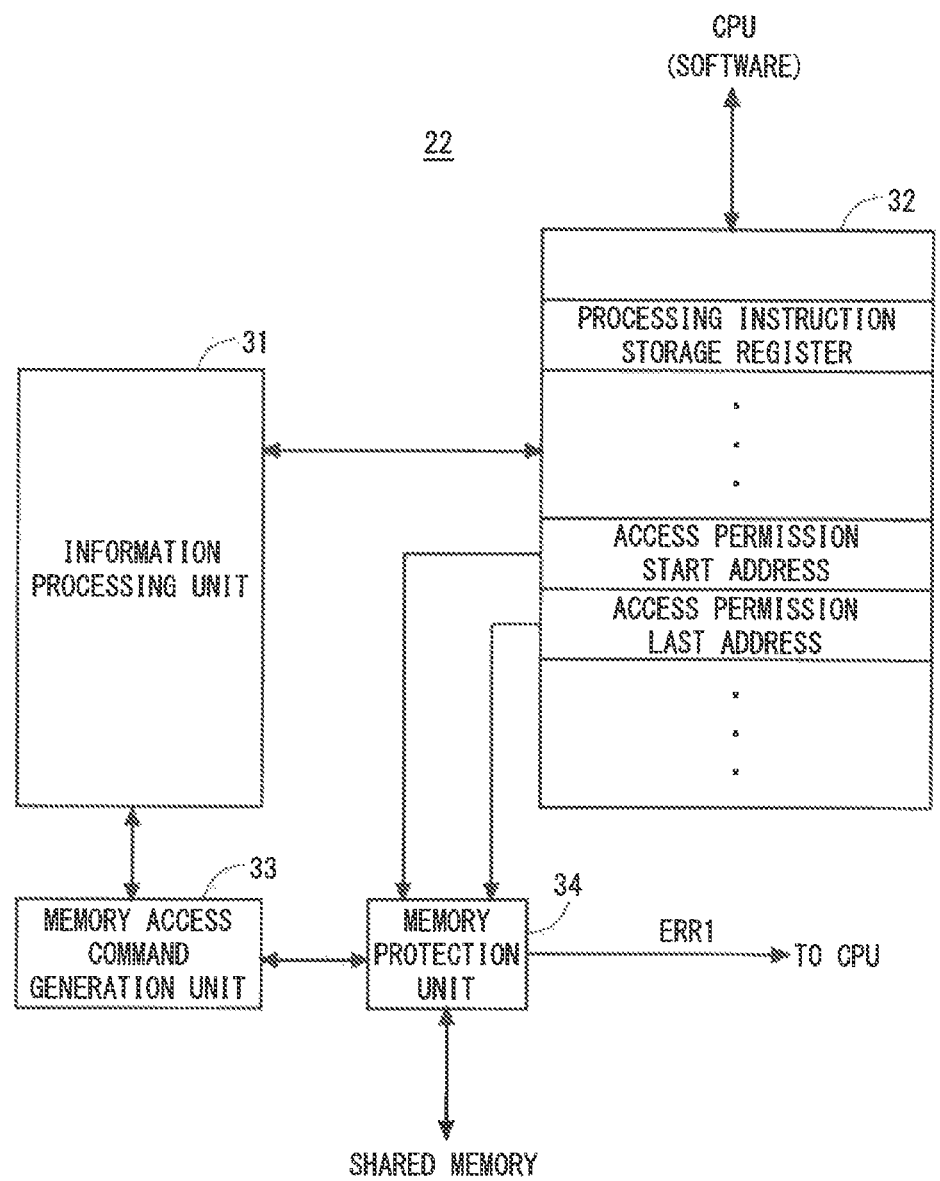
FIG. 2 is a block diagram of a hardware IP according to the first embodiment.

Therefore, FIG. 2 shows a block diagram of the hardware IP 22 according to the first embodiment. As shown in FIG. 2, the hardware IP 22 includes an information processing unit 31, a group of registers (hereinafter referred to as a "register group") 32, a memory access command generation unit 33, and a memory protection unit 34.

The information processing unit 31 performs a specific process according to an operation instruction provided from the CPU 10. The register group 32 includes a plurality of registers. In the example shown in FIG. 2, a processing instruction provided from the CPU 10 is stored in one of the plurality of registers. This processing instruction is for instructing the hardware IP 22 about what kind of operation it should perform. Further, access permission range address values provided from the CPU 10 are stored in two of the plurality of registers. Further, the access permission range address values include an access permission start address indicating a start address of an access permission range and an access permission last address indicating a last address of the access permission range. Further, data to be processed by the information processing unit 31, operation parameters used for the data process, and the like are also stored in registers included in the register group 32. Note that each of the hardware IPs 22 and 23 can specify an access permission range by using registers that store an access permission start address and an access permission area size, instead of using the registers storing the access permission start address and the access permission last address.

When an access request occurs in the information processing unit 31, the memory access command generation unit 33 generates an address in the shared memory 21 corresponding to the access request and outputs the access request with the generated access address attached thereto. For example, when an access request for a pixel value at specific coordinates in an image stored in the shared memory 21 occurs in the information processing unit 31, the memory access command generation unit 33 generates an address in the shared memory 21 at which the pixel specified by the information processing unit 31 by using the coordinates is stored.

The memory protection unit 34 provides, among access requests issued from the information processing unit 31 to the shared memory 21, access requests for addresses within the access permission range specified by the access permission range address values to the shared memory 21 and blocks (i.e., intercepts) access requests for addresses outside the access permission range specified by the access permission range address values. Note that in the hardware IP 22, an access request that is received by the memory protection unit 34 is output from the memory access command generation unit 33.

Further, when the memory protection unit 34 detects an access request for an address outside the access permission range specified by the access permission range address values, it outputs an error notification ERR1 to the CPU 10. Then, in response to the error notification ERR1, the CPU 10 performs at least one of a process for stopping the operation of the hardware IP 22 and a process for stopping the program using the hardware IP 22 as an interrupt process.

As described above, in the semiconductor device 1 according to the first embodiment, the hardware IP 22 determines whether or not an access request issued from the information processing unit 31 to the shared memory 21 should be actually provided to the shared memory 21 based on the access permission range address values set by the CPU 10. Therefore, FIG. 3 shows a diagram for explaining a relation between a memory arrangement and access permission ranges in the semiconductor device 1 according to the first embodiment.

In each of FIGS. 3 and 4, a memory space indicating rights to use memories and registers in the semiconductor device 1 is shown in the form of a memory arrangement. In the semiconductor device 1 according to the first embodiment, the CPU 10 can access the whole memory space including a system area, which is a memory space requiring the highest reliability, so that the CPU 10 can perform a reliability-verified program (e.g., a functionally-safe application) and a reliability-unverified program (e.g., a functionally-unsafe application). Meanwhile, as for the hardware IP, when a processing instruction is an instruction by a functionally-unsafe application, the hardware IP is permitted to access, in the access range permitted for functionally-unsafe applications, only a memory space from the access permission start address stored in the register group 32 to the access permission last address also stored in the register group 32 as shown in FIG. 3.

Similarly, when a processing instruction is an instruction by a functionally-safe application, the hardware IP is permitted to access, in the access range permitted for functionally-safe applications, only a memory space from the access permission start address stored in the register group 32 to the access permission last address also stored in the register group 32 as shown in FIG. 4.

Next, an operation of the semiconductor device 1 according to the first embodiment is explained. In the following explanation, the operation of the semiconductor device 1 is divided into a hardware IP start-up operation, a hardware IP register setting operation, a hardware IP memory access operation, and an operation in which a memory access violation occurs, and they are explained one by one.

Figure 5:
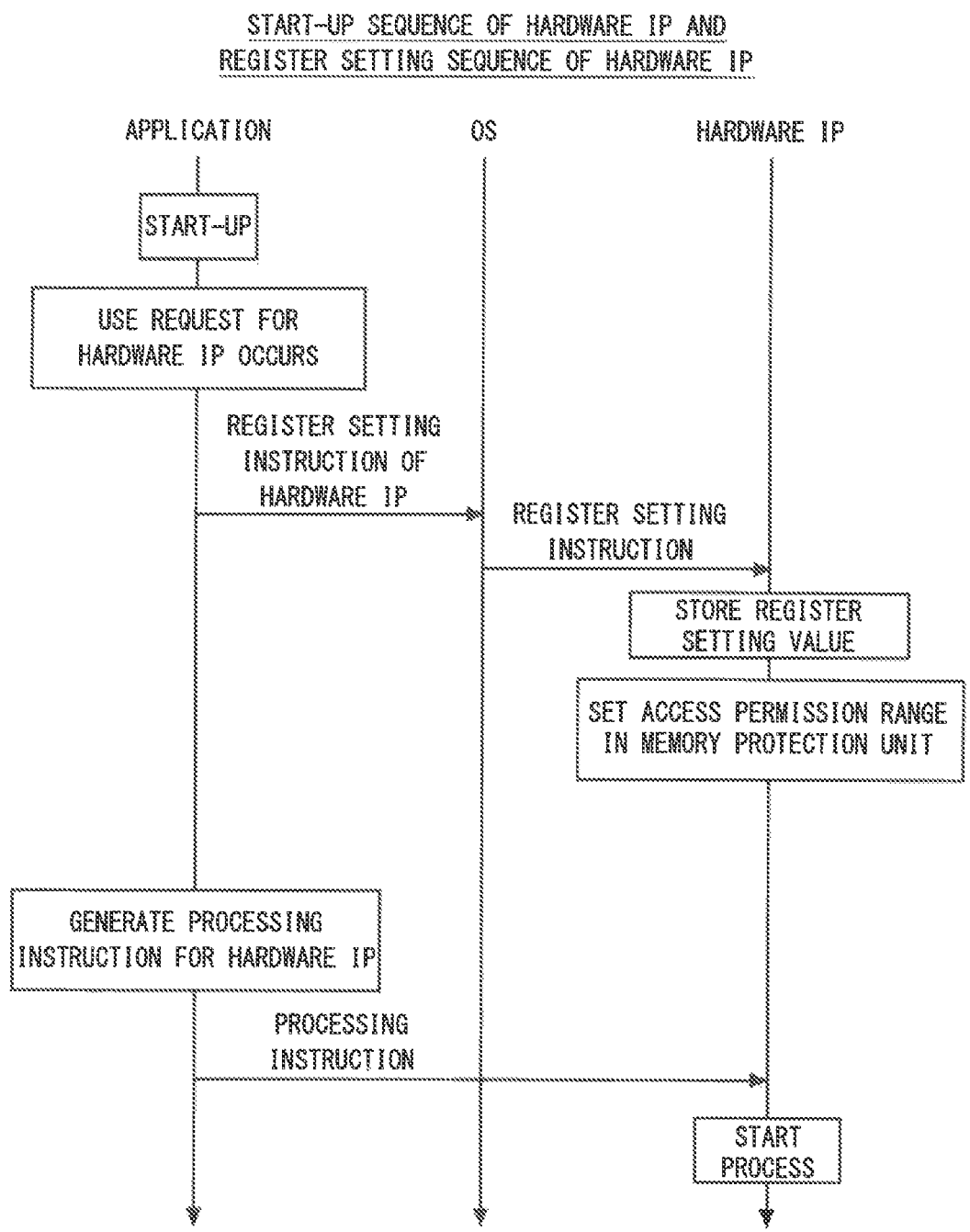
FIG. 5 is a sequence diagram for explaining a start-up sequence and a register setting sequence of the hardware IP according to the first embodiment.

Firstly, FIG. 5 shows a sequence diagram for explaining a start-up sequence and a register setting sequence of the hardware IP according to the first embodiment. In the semiconductor device 1 in the example shown in FIG. 5, after an application is started, a request to use the hardware IP occurs. Then, because of the occurrence of the use request for the hardware IP, the application outputs (i.e., the application causes the CPU to output) a register setting instruction for the hardware IP 22.

The application outputs a register setting instruction including access permission range address values as one of operation parameters for the hardware IP to a functionally-safe application (an OS in FIG. 5). Upon receiving the register setting instruction from the application, the OS outputs the register setting instruction to the hardware IP.

Then, the hardware IP stores the operation parameters included in the register setting instruction into the register group 32. Further, the hardware IP sets an access permission range in the memory protection unit 34 based on the access permission range address values included in the operation parameters stored in the register group 32.

Then, the application generates an instruction about a specific process for the hardware IP and provides this specific process as a processing instruction to the hardware IP. The hardware IP starts a process in response to this processing instruction.

As described above, the CPU 10 performs the process for storing the access permission range address values into the register group 32 of the hardware IP before starting up the hardware IP.

Figure 6:
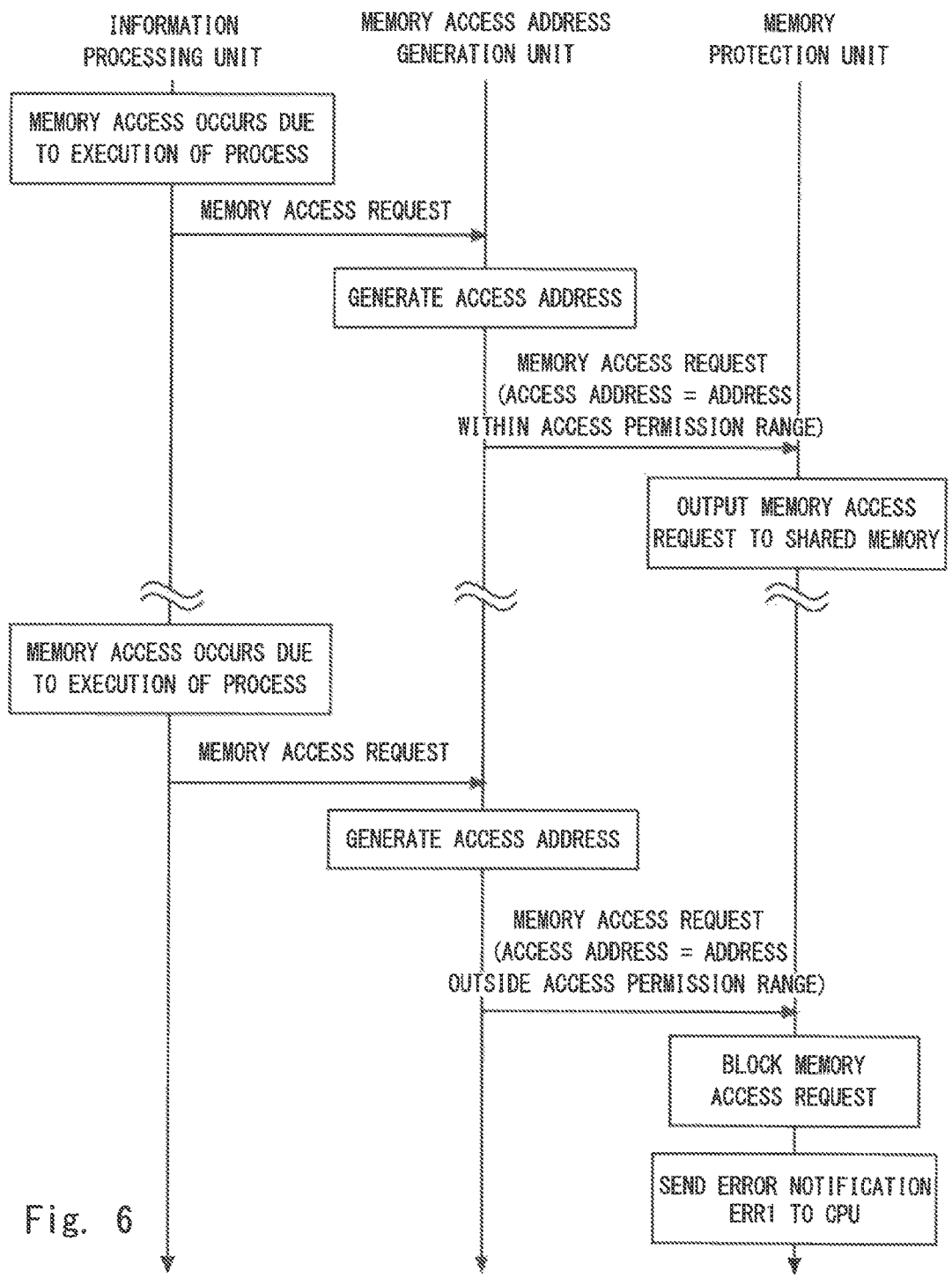
FIG. 6 is a sequence diagram for explaining a first example of a memory access sequence of the hardware IP according to the first embodiment.

Next, FIG. 6 shows a sequence diagram for explaining a first example of a memory access sequence of the hardware IP according to the first embodiment. As shown in FIG. 6, in the hardware IP according to the first embodiment, when memory access occurs by a process in the information processing unit 31, the information processing unit 31 outputs a memory access request to the memory access command generation unit 33 and the memory access command generation unit 33 generates an access address. Then, the hardware IP accesses the shared memory 21 by using the access address generated in the memory access command generation unit 33. Note that when the access address generated in the memory access command generation unit 33 is within the access permission range, the hardware IP outputs the access request to the shared memory 21. On the other hand, when the access address generated in the memory access command generation unit 33 is outside the access permission range, the hardware IP blocks the access request and sends an error notification ERR1 to the CPU 10.

Figure 7:
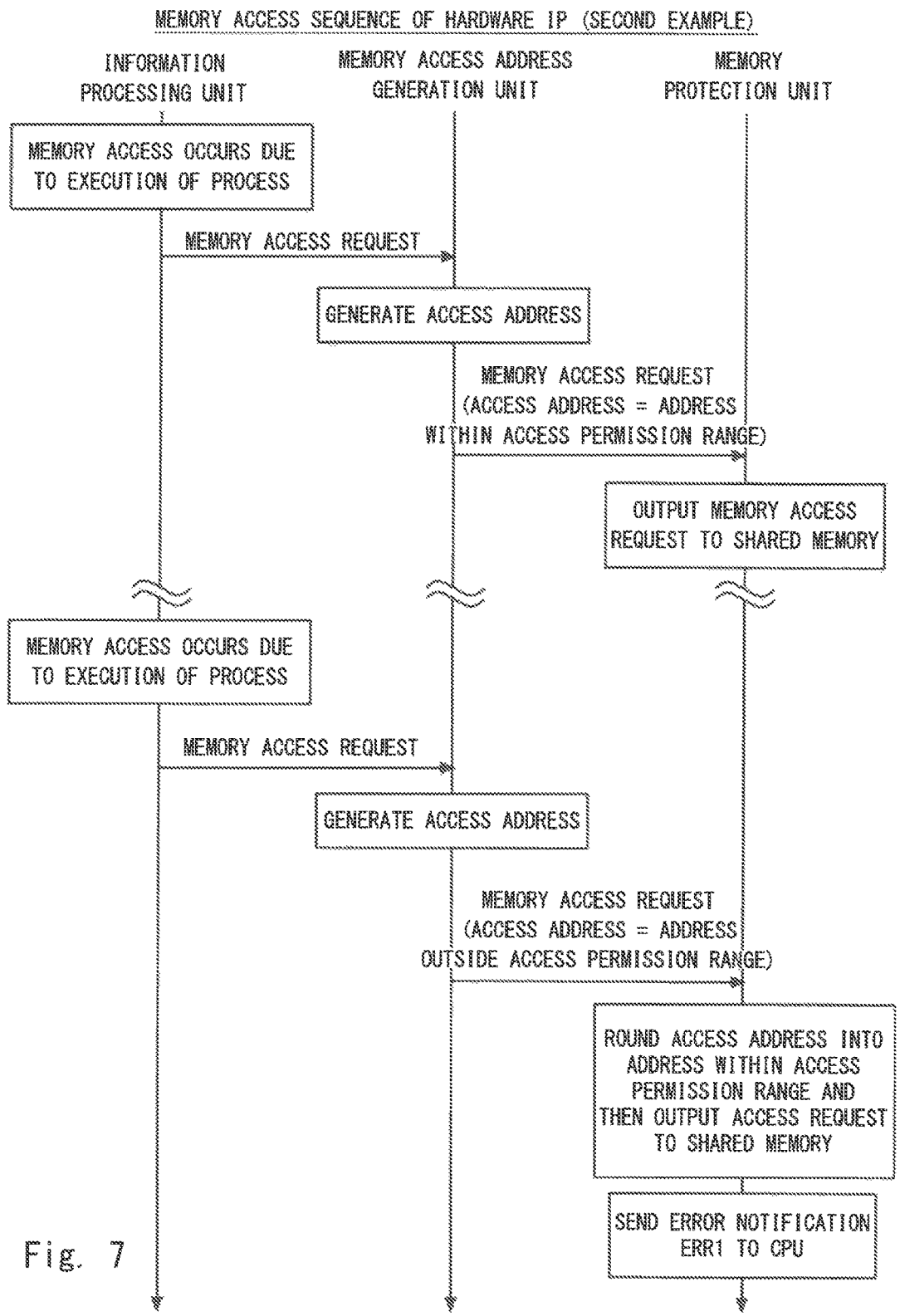
FIG. 7 is a sequence diagram for explaining a second example of a memory access sequence of the hardware IP according to the first embodiment.

Further, FIG. 7 is a sequence diagram for explaining a second example of a memory access sequence of the hardware IP according to the first embodiment. As shown in FIG. 7, in the second example of the memory access sequence of the hardware IP, an operation of the memory protection unit 34 that is performed when the access address generated in the memory access command generation unit 33 is outside the access permission range differs from the operation in the first example. In the second example, when the access address generated in the memory access command generation unit 33 is outside the access permission range, the memory protection unit 34 performs a process for round the access address provided from the memory access command generation unit 33 into an address within the access permission range and then outputs the rounded access request to the shared memory 21. Further, even in the second example, when a memory access violation occurs, the memory protection unit 34 sends an error notification ERR1 to the CPU 10.

As shown in the first and second examples of the memory access sequence of the hardware IP, there are various conceivable methods for blocking an access request according to the specifications as processes that are performed by the memory protection unit 34 when a memory access violation occurs.

Figure 8:
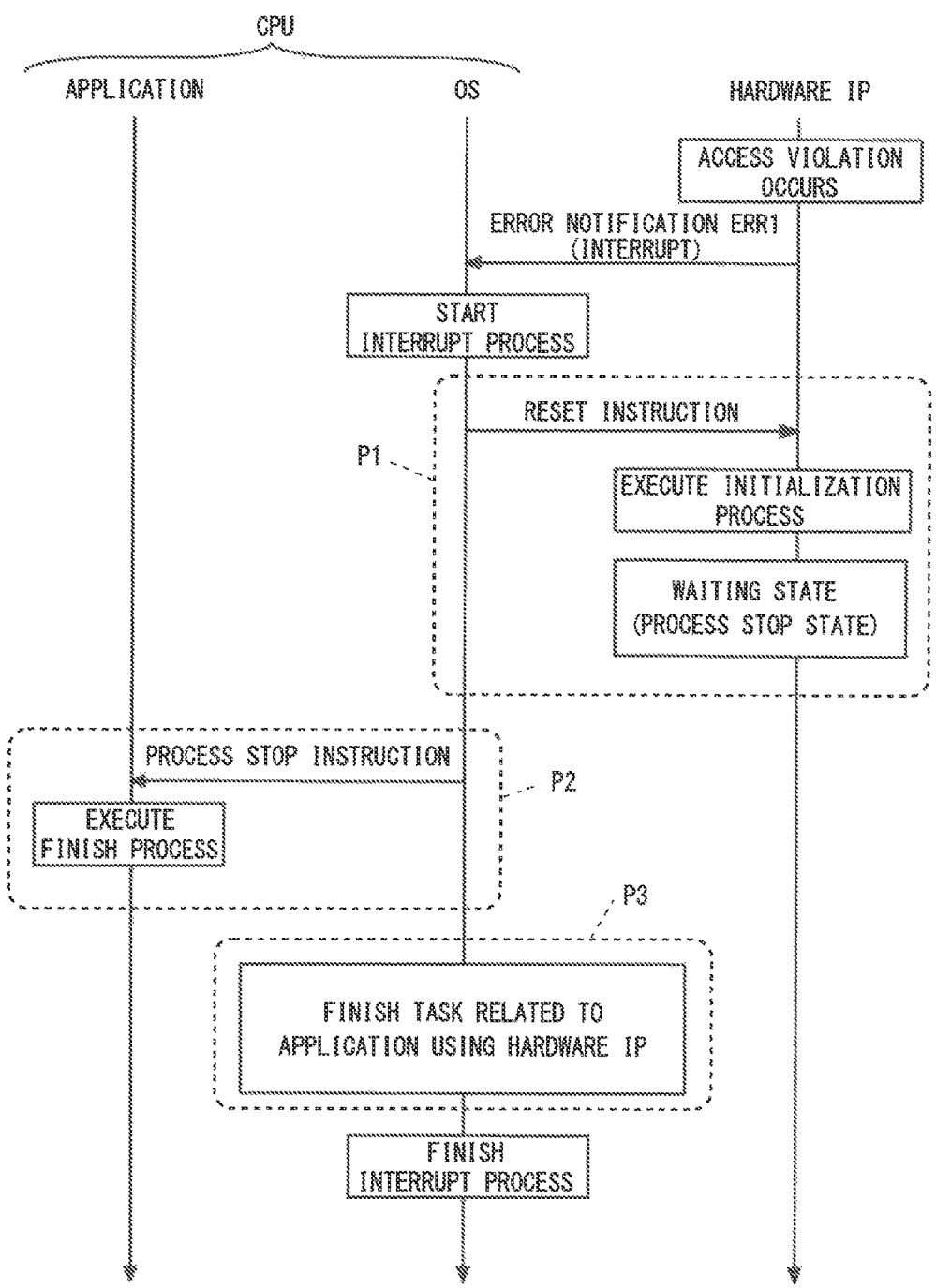
FIG. 8 is a sequence diagram for explaining a process sequence of the semiconductor device that is performed when a memory access violation occurs in the hardware IP according to the first embodiment.

Next, FIG. 8 is a sequence diagram for explaining a process sequence of the semiconductor device that is performed when a memory access violation occurs in the hardware IP according to the first embodiment. As shown in FIG. 8, in the semiconductor device 1 according to the first embodiment, when an error notification ERR1 is sent from the hardware IP to the CPU 10, a process in which the error notification ERR1 is caused is stopped by performing at least one of interrupt processes P1 to P3 for the error notification ERR1.

In the interrupt process P1, the OS issues (i.e., the OS causes the CPU to issue) a reset instruction (or an initialization instruction) to the hardware IP. The hardware IP performs an initialization process for restoring the information processing unit 31, the register group 32, the memory access command generation unit 33, and the memory protection unit 34 to initialized states based on this reset instruction.

In the interrupt process P2, the OS issues a process stop instruction to the application that is using the hardware IP. Upon receiving the process stop instruction, the application performs a finish process irrespective of its processing state at that moment and thereby stops the process.

In the interrupt process P3, the OS finishes a task related to the application that is using the hardware IP irrespective of its processing state at that moment. In the example shown in FIG. 8, at the moment when the interrupt processes P1 to P3 are finished, the OS finishes the interrupt process that is performed in response to the error notification ERR1.

As explained above, in the semiconductor device 1 according to the first embodiment, the memory protection unit 34 provided in the hardware IP outputs only access requests for addresses within the memory access range provided from the CPU 10 to the shared memory 21. Therefore, in the semiconductor device 1 according to the first embodiment, the CPU 10 can restrict the access range for the hardware IP. Further, in the semiconductor device 1 according to the first embodiment, by restricting the access range for the hardware IP, it is possible to prevent the hardware IP from corrupting (i.e., destructing) data stored in an area used by other applications due to a malfunction of the application running on the CPU 10 or due to hacking or the like.

Further, the semiconductor device 1 according to the first embodiment can achieve high processing performance by having the hardware IP process a process of a part of a program executed by the CPU 10. Further, by providing the hardware IP with the memory protection mechanism as described above, the semiconductor device 1 according to the first embodiment can achieve both high processing performance and high reliability.

Second Embodiment

In a second embodiment, a hardware IP 22a, which is another embodiment of the hardware IP 22, is explained. Note that in the following explanation of the second embodiment, the same symbols as those of the first embodiment are assigned to the same components/structures as those of the first embodiment and their explanations are omitted.

Figure 9:
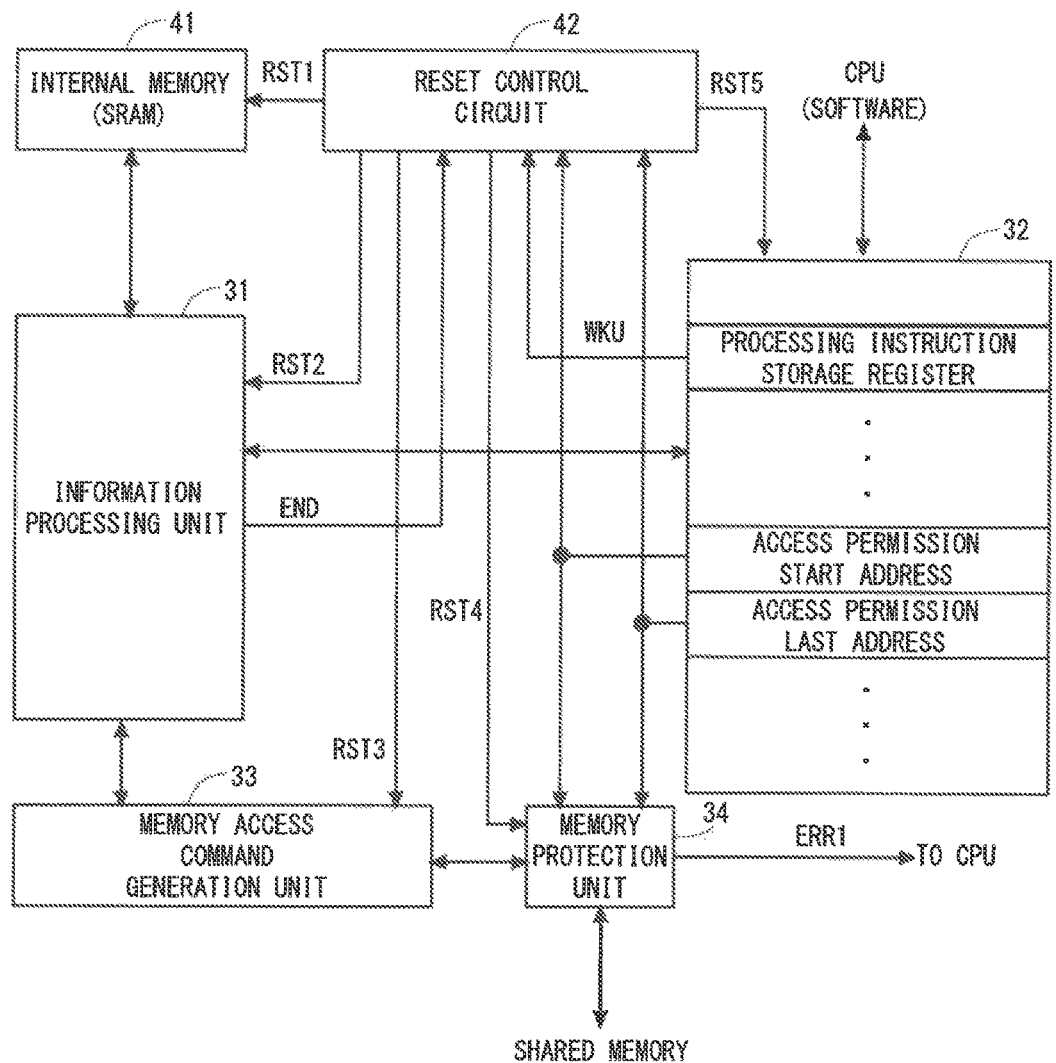
FIG. 9 is a block diagram of a hardware IP according to a second embodiment.

FIG. 9 shows a block diagram of the hardware IP 22a according to the second embodiment. As shown in FIG. 9, the hardware IP 22a according to the second embodiment is obtained by adding an internal memory 41 and a reset control circuit 42 in the hardware IP 22 according to the first embodiment.

The internal memory 41 is a memory whose memory space is not defined in the memory space used by the CPU 10 and hence is a memory that only the hardware IP 22a can use. The internal memory 41 is, for example, an SRAM (Static Random Access Memory).

The reset control circuit 42 performs an initialization process for initializing at least the register group 32, the information processing unit 31, the memory protection unit 34, the internal memory 41, and the shared memory 21. Further, the reset control circuit 42 performs the initialization process at least either in the start-up of the hardware IP 22a or in the end of its operation. In the example shown in FIG. 9, when a processing instruction issued from the CPU 10 is stored in a processing instruction storage register, the reset control circuit 42 recognizes that a start-up instruction WKU is issued. Therefore, the reset control circuit 42 performs an initialization process at the start-up based on this start-up instruction WKU. Further, the reset control circuit 42 performs an initialization process at the end of its operation based on an end notification signal END output from the information processing unit 31 or a stop instruction STP issued from the CPU 10. Further, in the example shown in FIG. 9, the reset control circuit 42 initializes the internal memory 41 by using an initialization signal RST1, initializes the information processing unit 31 by using an initialization signal RST2, initializes the memory access command generation unit 33 by using an initialization signal RST3, initializes the memory protection unit 34 by using an initialization signal RST4, and initializes the register group 32 by using an initialization signal RST5. Further, the reset control circuit 42 refers to access permission range address values stored in the register group 32 when it initializes the shared memory 21.

Next, an operation of the hardware IP 22a according to the second embodiment is explained. Therefore, FIG. 10 shows a sequence diagram for explaining a start-up sequence of the hardware IP according to the second embodiment.

Figure 10:
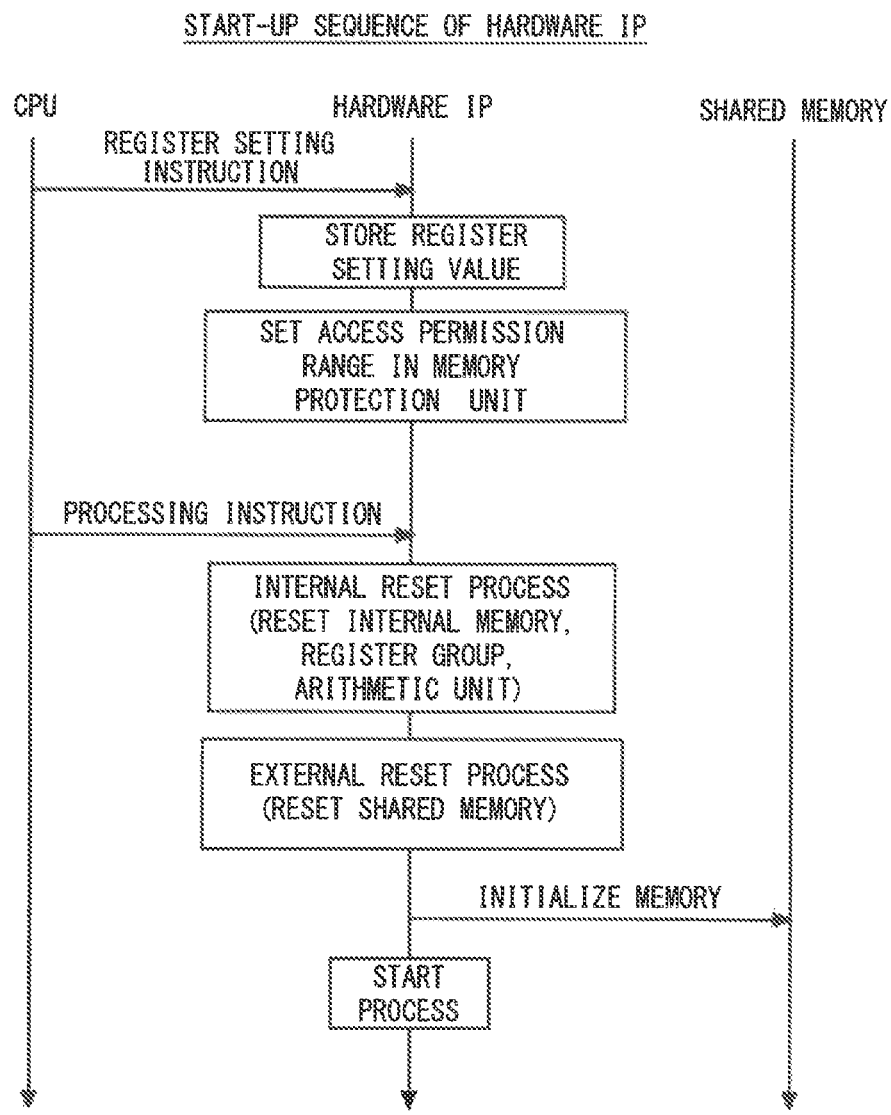
FIG. 10 is a sequence diagram for explaining a start-up sequence of the hardware IP according to the second embodiment.

As shown in FIG. 10, the CPU 10 provides a register setting instruction to the hardware IP 22a. Upon receiving the register setting instruction, the hardware IP 22a stores register setting values into the register group 32. Further, the hardware IP 22a sets (or defines) an access permission range in the memory protection unit 34 based on access permission range address values included in the register setting values stored in the register group 32. After that, the CPU 10 provides a processing instruction to the hardware IP.

In response to the notification of the processing instruction from the CPU 10, the hardware IP 22a first performs an internal reset process. In this internal reset process, the hardware IP 22a resets (i.e., initializes) at least the internal memory 41 and the information processing unit 31. After that, the reset control circuit 42 of the hardware IP 22a performs an external reset process for performing an initialization process for the access permission range in the shared memory 21 specified by the access permission range address values stored in the register group 32. After completing this external reset process, the hardware IP 22a starts a process according to the processing instruction.

Figure 11:
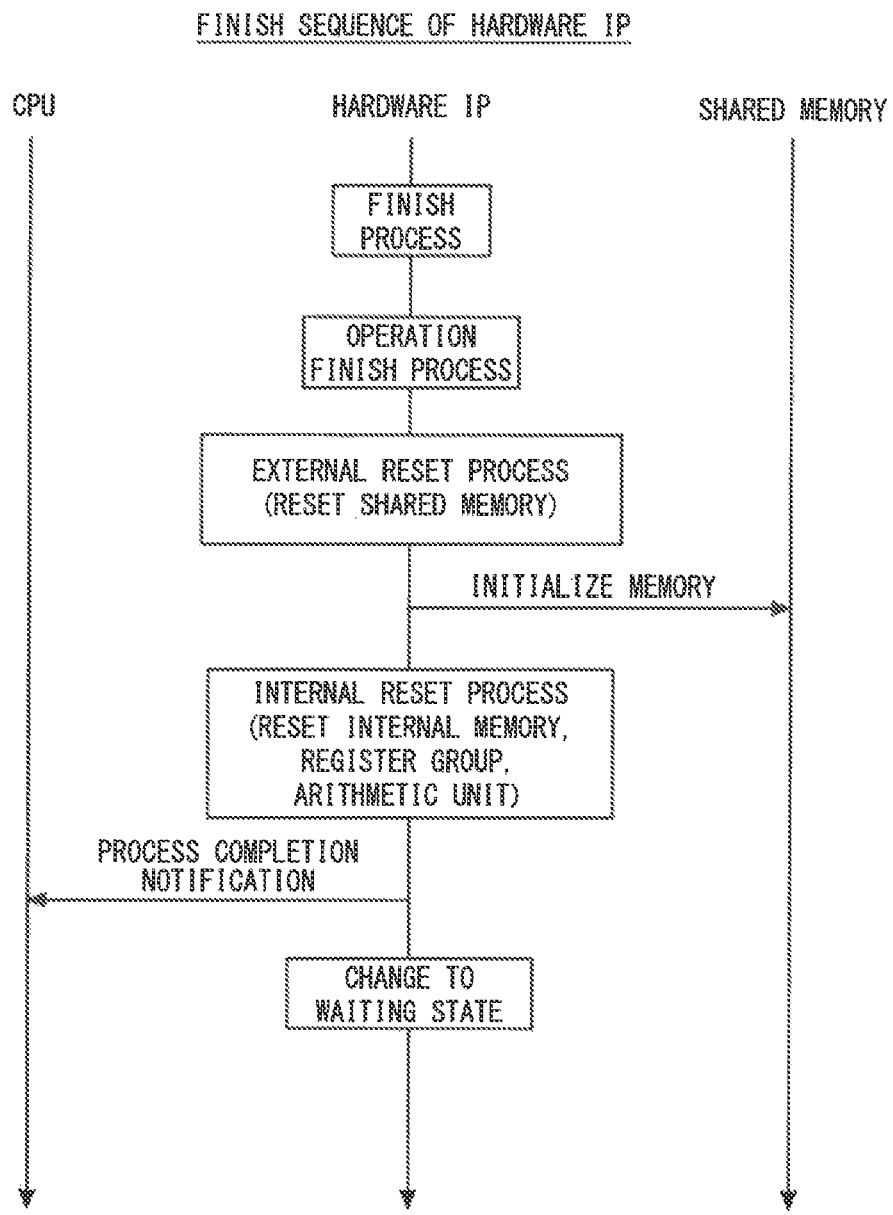
FIG. 11 is a sequence diagram for explaining a finish sequence of the hardware IP according to the second embodiment.

Next, FIG. 11 is a sequence diagram for explaining a finish sequence of the hardware IP according to the second embodiment. In FIG. 11, a finish sequence that is performed after a predetermined process is completed in the hardware IP 22a is shown. However, a finish sequence that is performed based on a stop instruction STP issued from the CPU 10 is substantially the same as the above-described finish sequence, except that an operation finish process and a subsequent process are performed based on the stop instruction STP.

As shown in FIG. 11, the hardware IP 22a starts an operation finish process when the process in the information processing unit 31 is finished. In this operation finish process, firstly, the reset control circuit 42 of the hardware IP 22a performs an external reset process for performing an initialization process for the access permission range in the shared memory 21 specified by the access permission range address values stored in the register group 32. After that, the hardware IP 22a performs an internal reset process for resetting at least the internal memory 41, the information processing unit 31, and the register group 32. Then, when this internal reset process is completed, the hardware IP 22a outputs a process completion notification to the CPU 10 and changes its state to a waiting state (or a standby state) in which the hardware IP 22a waits for the next operation instruction.

In the above explanation, an example in which the register group 32 and the whole area corresponding to the access permission range in the shared memory 21 are initialized in the reset process in the finish sequence is explained. However, there are cases in which when a process using the hardware IP 22a is performed, its processing result needs to be kept (i.e., left undeleted) so that an application can refer to the processing result of the hardware IP 22a after the operation of the hardware IP 22a is finished. In such cases, the hardware IP 22a needs to store (or save) the processing result that should be kept in an area that is not initialized by the initialization process performed by the reset control circuit 42. Therefore, another example of an external reset process performed by the reset control circuit 42 is explained with reference to FIG. 12.

Figure 12:
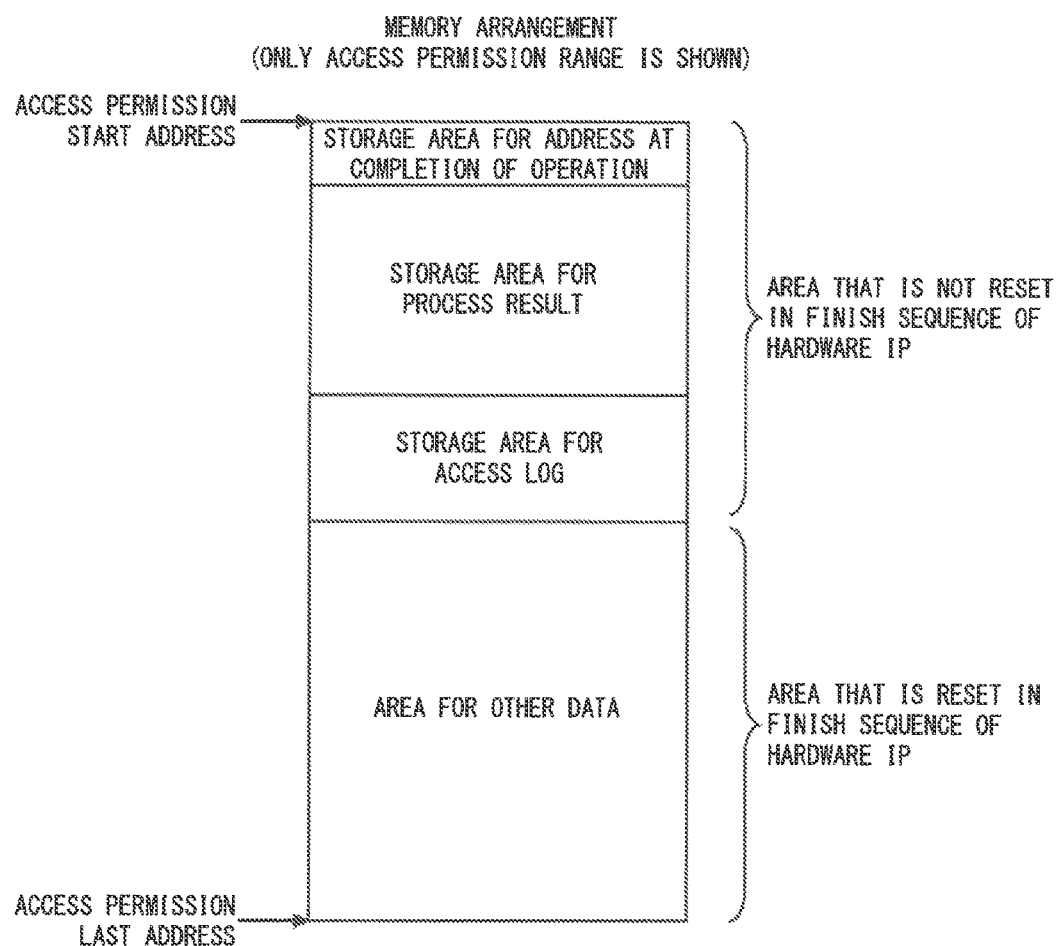
FIG. 12 is a diagram for explaining a memory arrangement of access permission ranges set in the hardware IP according to the second embodiment.

FIG. 12 is a diagram for explaining a memory arrangement for access permission ranges set (or defined) in the hardware IP according to the second embodiment. In the example shown in FIG. 12, the access permission range specified by the access permission start address and the access permission last address is divided into an area that is not reset during the finish sequence of the hardware IP 22 and an area that is reset during the finish sequence. For example, the hardware IP 22a stores information that should be kept in an area that is not reset during the finish sequence. In the example shown in FIG. 12, an operation completion address storage area, a process result storage area, and an access log storage area are defined (i.e., allocated) in an area that is not reset during the finish sequence. Further, in the external reset process in the finish sequence, the reset control circuit 42 initializes only the area that should be reset during the finish sequence. The area that is not reset in the external reset process in the finish sequence is specified, for example, as one of register setting values stored in the register group 32. As for the register group 32, it is also possible to prevent a processing result that should be kept from being initialized by the initialization process performed by the reset control circuit 42 by defining (i.e., dividing the register group 32 into) an area that is not reset during the finish sequence and an area that is reset during the finish sequence. Further, a processing result in the register group 32 that should be kept may be stored in an area within the access permission range in the shared memory 21 that is not reset.

In some cases, the hardware IP is used by a plurality of applications. In such a situation, there is a problem that, for example, when a register setting value or a processing result that is used in the previous process remains in the hardware IP, an application that uses the hardware IP later could malfunction because of the presence of the remaining information, or that hacking can be performed between applications by using the remaining information as a clue.

However, in the hardware IP 22a according to the second embodiment, used information is initialized (i.e., deleted) when the hardware IP 22a is started up and when its operation is finished. In this way, the semiconductor device including the hardware IP 22a according to the second embodiment can prevent the problem which would otherwise be caused due to data interference between applications and lower the possibility of hacking.

In particular, the internal memory 41 provided in the hardware IP 22a according to the second embodiment is a memory space that is not defined in the memory space recognized by the CPU 10. Since this internal memory 41 is not recognized by the CPU 10, it is impossible to reset the internal memory 41 under normal circumstances. However, the above-described internal memory 41 can be initialized in the hardware IP 22a according to the second embodiment. Therefore, it is possible to prevent the problem which would otherwise be caused by the information remaining in the internal memory 41.

Third Embodiment

In a third embodiment, a semiconductor device 2, which is another embodiment of the semiconductor device 1 according to the first embodiment, is explained. Note that in the following explanation of the third embodiment, the same symbols as those of the first embodiment are assigned to the same components/structures as those of the first embodiment and their explanations are omitted.

Figure 13:
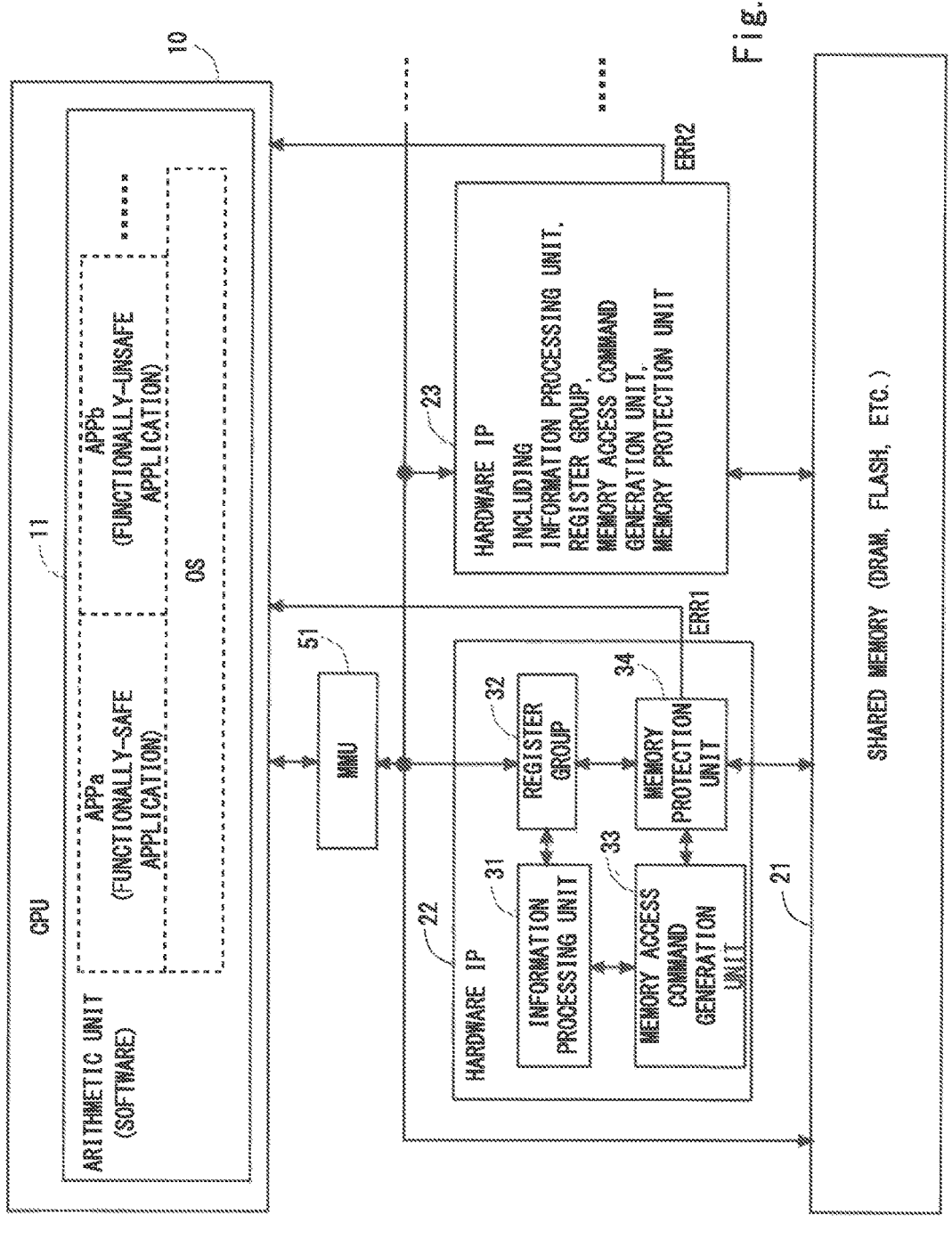
FIG. 13 is a block diagram of a semiconductor device according to a third embodiment.

FIG. 13 shows a block diagram of the semiconductor device 2 according to the third embodiment. As shown in FIG. 13, the semiconductor device 2 according to the third embodiment is obtained by adding a memory management unit 51 in the semiconductor device 1 according to the first embodiment. The memory management unit 51 controls (i.e., changes) an access range for each program executed by the CPU 10.

FIG. 14 is a diagram for explaining an example of a relation between a memory arrangement and access permission ranges in the semiconductor device 2 according to the third embodiment. As shown in FIG. 14, in the semiconductor device 2 according to the third embodiment, the memory management unit 51 permits, among the programs executed in the CPU 10, a functionally-safe application to access the whole memory space. Meanwhile, the memory management unit 51 can prohibit, among the programs executed in the CPU 10, a functionally-unsafe application from accessing an area in the memory space that is allocated for the functionally-safe application.

As explained above, in the semiconductor device 2 according to the third embodiment, the memory management unit 51 can set (i.e., defines) an access permission range for each application. The semiconductor device 2 according to the third embodiment can improve its reliability compared to that of the semiconductor device 1 according to the first embodiment by preventing interference between applications.

Fourth Embodiment

In a fourth embodiment, a hardware IP 22b, which is another embodiment of the hardware IP 22 according to the first embodiment, is explained. Note that a semiconductor device according to the fourth embodiment is explained hereinafter on the assumption that the semiconductor device is obtained by replacing the hardware IP 22 of the semiconductor device 2 according to the third embodiment with the hardware IP 22b. However, the hardware IP 22b can be used even when the semiconductor device does not include the memory management unit 51.

Figure 15:
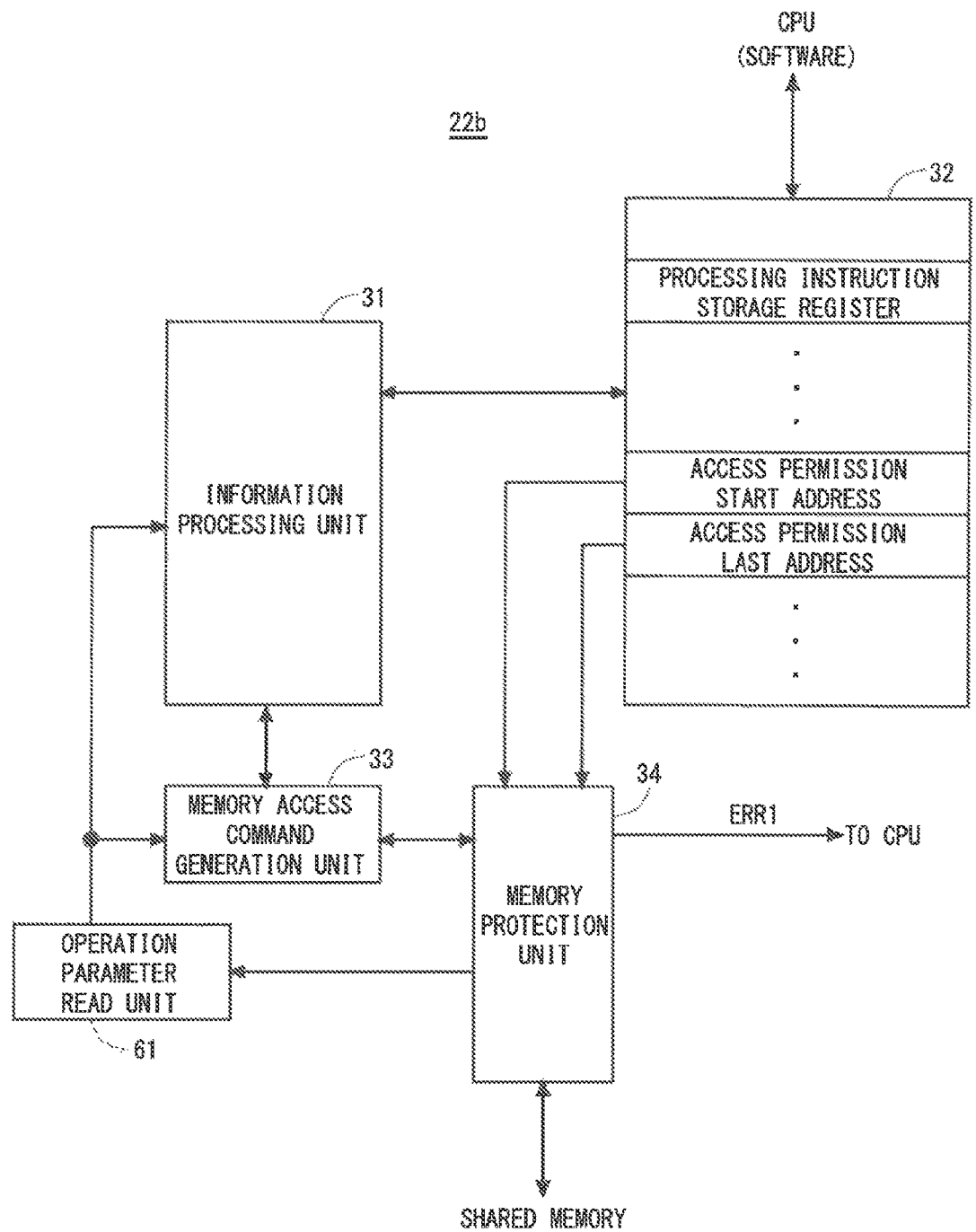
FIG. 15 is a block diagram of a hardware IP according to a fourth embodiment.

FIG. 15 shows a block diagram of the hardware IP 22b according to the fourth embodiment. As shown in FIG. 15, the hardware IP 22b is obtained by adding an operation parameter read unit 61 in the hardware IP 22 according to the first embodiment. The operation parameter read unit 61 reads an operation parameter stored in a parameter setting area set (i.e., defined) in the access permission range in the shared memory 21. Further, the memory access command generation unit 33 according to the fourth embodiment generates an access address for the shared memory based on the operation parameter provided from the operation parameter read unit 61.

In the semiconductor device according to the fourth embodiment, the hardware IP 22b is permitted to access a different memory range for each unit process indicated by an application of the CPU 10 and uses the permitted memory range. Further, a work memory that the hardware IP 22b uses when it is executing a process indicated by the application of the CPU 10 is specified by an operation parameter stored in the shared memory 21.

Figure 16:
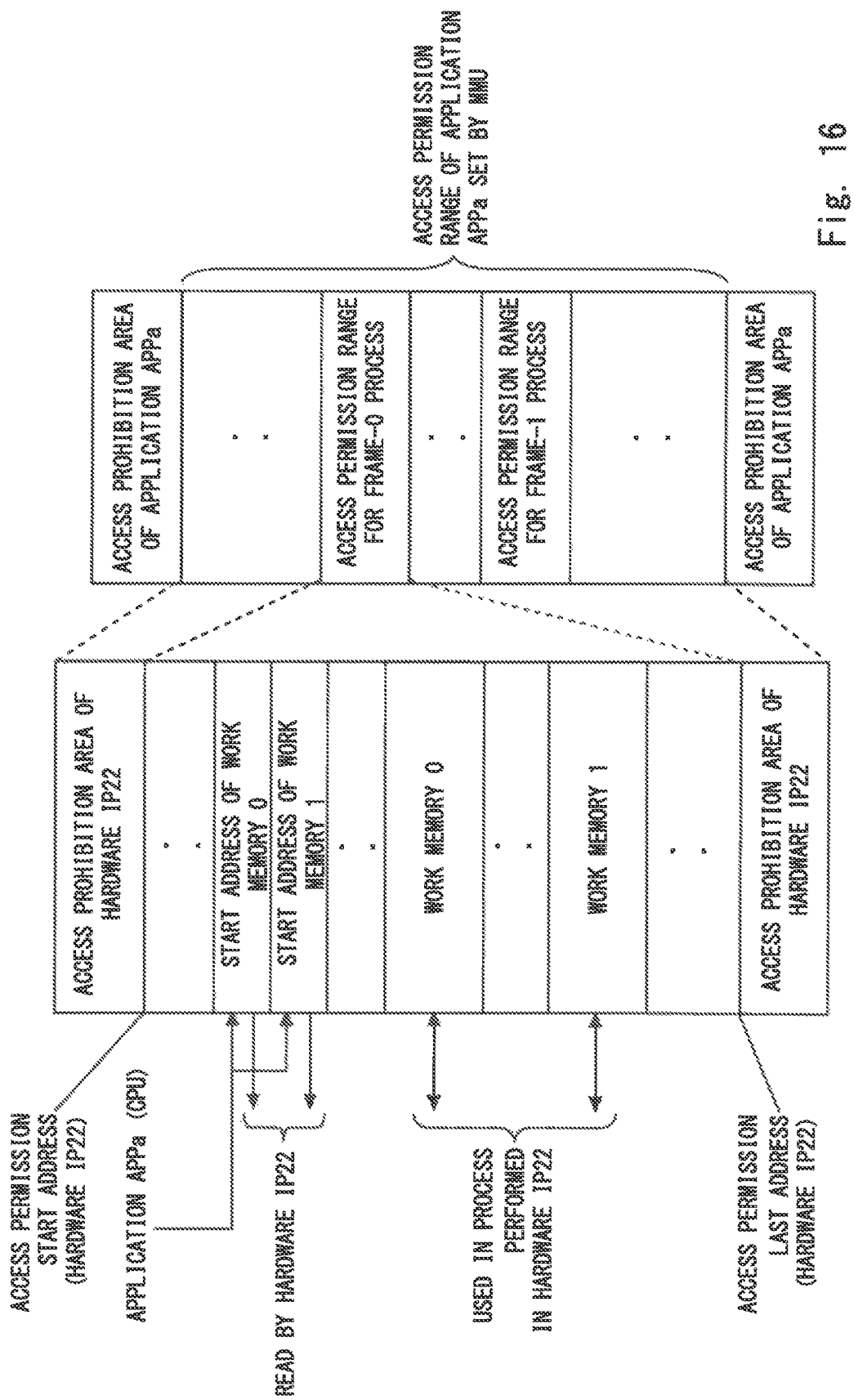
FIG. 16 is a diagram for explaining a relation between a memory arrangement and access permission ranges in the semiconductor device according to the fourth embodiment.

Therefore, FIG. 16 is a diagram for explaining a relation between a memory arrangement and access permission ranges in the semiconductor device according to the fourth embodiment. In the example shown in FIG. 16, the hardware IP 22b is used to play back a moving picture. In this moving-picture playback process, it is necessary to decode an image on a frame-by-frame basis and the hardware IP 22b performs this decoding process. Further, in the example shown in FIG. 16, the hardware IP 22b is used by an application APPa. Further, in the example shown in FIG. 16, the hardware IP 22b performs a decoding process by using, in the access permission range for the application APPa set by the memory management unit 51, an access permission range for a frame-0 process.

As shown in FIG. 16, the access permission range used by the hardware IP 22b is an access permission range set in the register group 32 of the hardware IP 22b. That is, the access permission range address values stored in the register group 32 of the hardware IP 22b have address values in a memory management area permitted for a program that uses the hardware IP 22b in the memory management unit 51.

Further, in the semiconductor device according to the fourth embodiment, the start address of a work memory 0 and the start address of a work memory 1 are stored within the access permission range of the hardware IP 22b. Addresses within the access permission range are set for these start addresses of the work memories by the application APPa. Further, by using the operation parameter read unit 61, the hardware IP 22b reads the start address of a work memory for each unit process of the hardware IP 22b and uses the address within the access permission range as the address of the work memory.

As explained above, in the semiconductor device according to the fourth embodiment, a work memory in the shared memory 21 used by the hardware IP 22b can be arbitrarily set from the application APPa. However, since the start address of the work memory is set in the shared memory 21, the operation parameter read unit 61 could read a wrong address due to a failure in the shared memory 21 or a malfunction of the application APPa. Further, when this wrong address is within the access permission range set by an MMU, there is a risk that a memory range that is permitted for access that occurs in a different frame could be corrupted (i.e., destructed). Even in such a case, in the semiconductor device according to the fourth embodiment, owing to the memory protection unit 34, the access is performed outside the access permission range set for each frame, thus preventing the memory range used in the different frame from being corrupted. In this way, the semiconductor device according to the fourth embodiment can prevent the hardware IP 22b from corrupting data stored in a memory area used in a different frame due to a malfunction of an application running on the CPU 10, hacking, or the like, while providing high flexibility in the arrangement of work memories in the shared memory 21 used by the hardware IP 22b.

Further, in the semiconductor device according to the fourth embodiment, within the memory management area that is set by the memory management unit 51 and is permitted for access that occurs in a program using the hardware IP 22b, an access permission range for the hardware IP 22b is further set. In this way, it is possible to prevent the program using the hardware IP 22b or another hardware IP used by the program using the hardware IP 22b from corrupting information in the shared memory 21.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first and second embodiments can be combined as desirable by one of ordinary skill in the art.

For example, although the above explanation is given by using a functionally-safe application and a functionally-unsafe application, the functionally-safe application and the functionally-unsafe application in the explanation can be replaced by a host OS and a guest OS, respectively.

What is claimed is:

1. A semiconductor device comprising:
a main-arithmetic unit configured to execute a program;
a sub-arithmetic unit configured to execute a process of a part of the program executed by the main-arithmetic unit; and
a shared memory configured to be accessed by the main-arithmetic unit and the sub-arithmetic unit,
wherein the sub-arithmetic unit comprises:
a register configured to store an access permission range address value provided from the main-arithmetic unit;
an information processing unit configured to execute a predetermined process according to an operation instruction provided from the main-arithmetic unit; and
a memory protection unit configured to provide, among access requests issued from the information processing unit to the shared memory, an access request for an address within an access permission range specified by the access permission range address value to the shared memory, and block an access request for an address outside the access permission range specified by the access permission range address value;
wherein the main-arithmetic unit executes, as the program, a reliability-verified program having a high reliability and a reliability-unverified program having a reliability lower than that of the reliability-verified program, and a process for storing the access permission range address value into the register of the sub-arithmetic unit is performed by the reliability-verified program.

2. The semiconductor device according to claim 1, wherein the main-arithmetic unit performs a process for storing the access permission range address value into the register of the sub-arithmetic unit before starting up the sub-arithmetic unit.

3. The semiconductor device according to claim 1, wherein when the memory protection unit detects an access request for an address outside the access permission range specified by the access permission range address value, the memory protection unit sends an error notification to the main-arithmetic unit, and in response to the error notification, the main-arithmetic unit performs at least one of a process for stopping an operation of the sub-arithmetic unit and a process for stopping a program using the sub-arithmetic unit as an interrupt process.

4. The semiconductor device according to claim 1, wherein the sub-arithmetic unit comprises:
   an internal memory whose memory space is not defined in a memory space used by the main-arithmetic unit, so that only the sub-arithmetic unit can use the internal memory; and
   a reset control circuit configured to perform an initialization process for initializing the register, the information processing unit, the memory protection unit, the internal memory, and the shared memory, and the reset control circuit performs the initialization process when the sub-arithmetic unit is started up and when an operation of the sub-arithmetic unit is finished.

5. The semiconductor device according to claim 4, wherein the reset control circuit does not perform the initialization process for a specific access permission range in the access permission range specified by the main-arithmetic unit.

6. The semiconductor device according to claim 1, wherein the program for which the CPU is configured to execute comprises one program of a plurality of programs that can be executed by the CPU, the semiconductor device further comprising a memory management unit configured to control an access range for each program executed by the main-arithmetic unit.

7. The semiconductor device according to claim 6, wherein the access permission range address value stored in the register of the sub-arithmetic unit has an address value within a memory management area permitted for a program using the sub-arithmetic unit in the memory management unit.

8. The semiconductor device according to claim 1, wherein the sub-arithmetic unit comprises:
   a parameter read unit configured to read an operation parameter stored in a parameter setting area set within the access permission range of the shared memory; and
   an access address generation unit configured to generate an access address for the shared memory based on the operation parameter provided from the parameter read unit.

9. The semiconductor device according to claim 1, wherein the shared memory is disposed on a semiconductor chip different from a chip in which the main-arithmetic unit and the sub-arithmetic unit are disposed.

10. A memory access control method performed in semiconductor device, wherein the semiconductor device comprises:
    a main-arithmetic unit configured to execute a program;
    a sub-arithmetic unit configured to execute a process of a part of the program executed by the main-arithmetic unit, the sub-arithmetic unit including a register configured to store an access permission range address value provided from the main-arithmetic unit; and
    a shared memory configured to be accessed by the main-arithmetic unit and the sub-arithmetic unit,
    the memory access control method comprising:
        the sub-arithmetic unit executing a predetermined process according to an operation instruction provided from the main-arithmetic unit; and
        the sub-arithmetic unit providing, among access requests issued to the shared memory according to the predetermined process, an access request for an address within an access permission range specified by the access permission range address value to the shared memory and blocking an access request for an address outside the access permission range specified by the access permission range address value; wherein the main-arithmetic unit executes, as the program, a reliability-verified program having a high reliability and a reliability-unverified program having a reliability lower than that of the reliability-verified program, and a process for storing the access permission range address value into the register of the sub-arithmetic unit is performed by the reliability-verified program.

11. The memory access control method for a semiconductor device according to claim 10, wherein the main-arithmetic unit performs a process for storing the access permission range address value into the register of the sub-arithmetic unit before starting up the sub-arithmetic unit.

12. The memory access control method for a semiconductor device according to claim 10, wherein when the sub-arithmetic unit detects an access request for an address outside the access permission range specified by the access permission range address value, the memory protection unit sends an error notification to the main-arithmetic unit, and in response to the error notification, the main-arithmetic unit performs at least one of a process for stopping an operation of the sub-arithmetic unit and a process for stopping a program using the sub-arithmetic unit as an interrupt process.

13. The memory access control method for a semiconductor device according to claim 10, wherein the sub-arithmetic unit comprises an internal memory whose memory space is not defined in a memory space used by the main-arithmetic unit, so that only the sub-arithmetic unit can use the internal memory, and the sub-arithmetic unit performs an initialization process for the internal memory when the sub-arithmetic unit is started up and when an operation of the sub-arithmetic unit is finished.

14. The memory access control method for a semiconductor device according to claim 13, wherein the sub-arithmetic unit does not perform the initialization process for a specific access permission range in the access permission range in the shared memory specified by the main-arithmetic unit.

15. The memory access control method for a semiconductor device according to claim 10, wherein the sub-arithmetic unit:

reads an operation parameter stored in a parameter setting area set within the access permission range of the shared memory; and generates an access address for the shared memory based on the read operation parameter.

16. The semiconductor device according to claim 1, wherein:

the reliability-verified program comprises a program having a high reliability that have been verified at a high level and are sufficiently protected in regard to functional safety or security in a mixed manner, and the reliability-unverified program comprises a program that have been verified only at a low level and are not sufficiently protected in regard to functional safety or security in a mixed manner.

17. The semiconductor device according to claim 16, wherein information on whether a program is a reliability-verified program or a reliability-unverified program is included in the program in advance, using a predetermined determination criterion.

18. The semiconductor device according to claim 16, wherein the reliability-verified program comprises a self-driving application in an automobile.

* * * * *